United States Patent [19]

Fassbender et al.

[11] 3,802,332

[45] Apr. 9, 1974

[54] METHOD AND APPARATUS FOR MAKING EDAM AND GOUDA CHEESE

[75] Inventors: Bernard W. Fassbender; Thomas H. Fassbender, both of Kaukauna; William L. Hermann, Wrightstown, all of Wis.

[73] Assignee: White Clover Daisy Company, Inc., Kaukauna, Wis.

[22] Filed: Mar. 21, 1973

[21] Appl. No.: 343,283

[52] U.S. Cl. .................................. 99/452, 426/36
[51] Int. Cl. ........................................... A01j 25/02
[58] Field of Search ............ 99/452, 456, 458, 460, 99/461; 426/36, 38, 39, 41

[56] References Cited
UNITED STATES PATENTS

| | | | |
|---|---|---|---|
| 2,942,343 | 6/1960 | Sjoholm | 99/458 |
| 3,047,951 | 8/1962 | Boeuf | 99/452 |
| 3,403,444 | 10/1968 | Chollet | 99/458 |
| 3,482,507 | 12/1969 | Richardson | 99/452 |

Primary Examiner—Robert W. Jenkins
Attorney, Agent, or Firm—Michael, Best & Friedrich

[57] ABSTRACT

In making a soft cheese (Gouda or Edam) the curd is developed in a vat and then pumped with the whey to a drum from which the curd is elevated above the level of the whey. The curd is then deposited onto a shaker pan which feeds the curd to hoops moving along a vibrating conveyor. The hoops have perforated ends and sides to allow whey to drain. The quantity of whey deposited in each hoop is quite uniform. Followers are promptly placed on each filled hoop and the hoops are then fed under a spring loaded shoe which converges towards the conveyor bottom. This applies pressure to expel whey, knit the curd, and give the cheese its final shape.

6 Claims, 3 Drawing Figures

PATENTED APR 9 1974 3,802,332
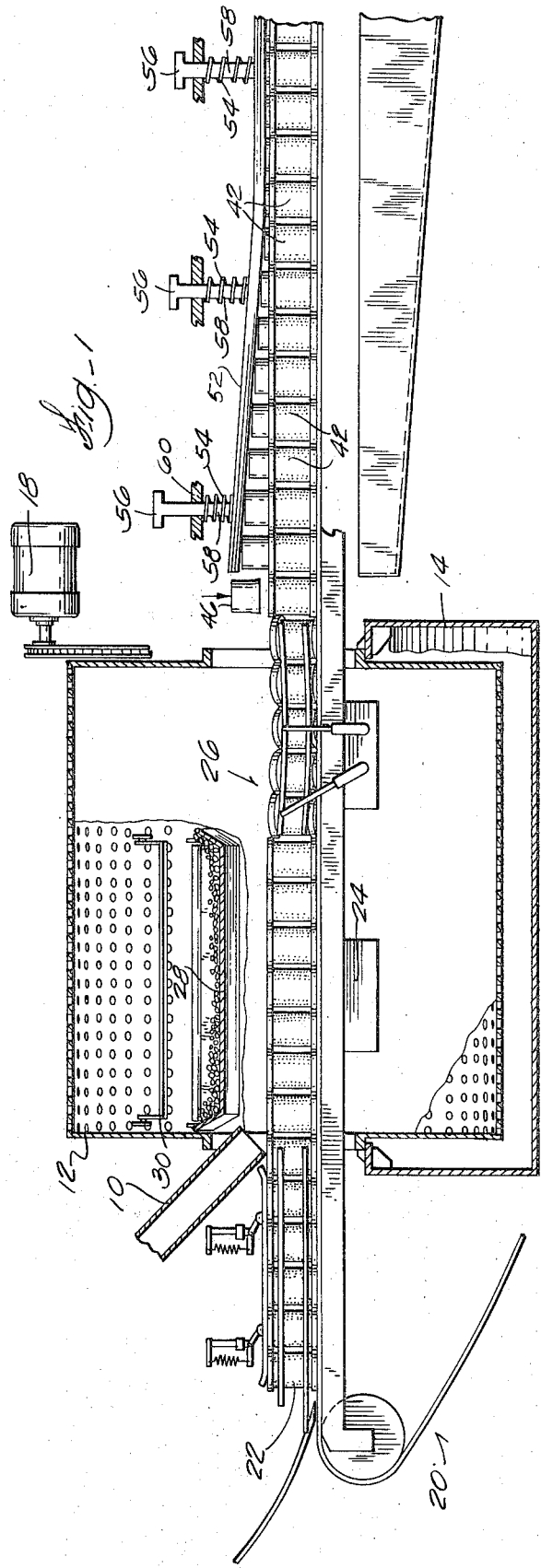
Fig. 1
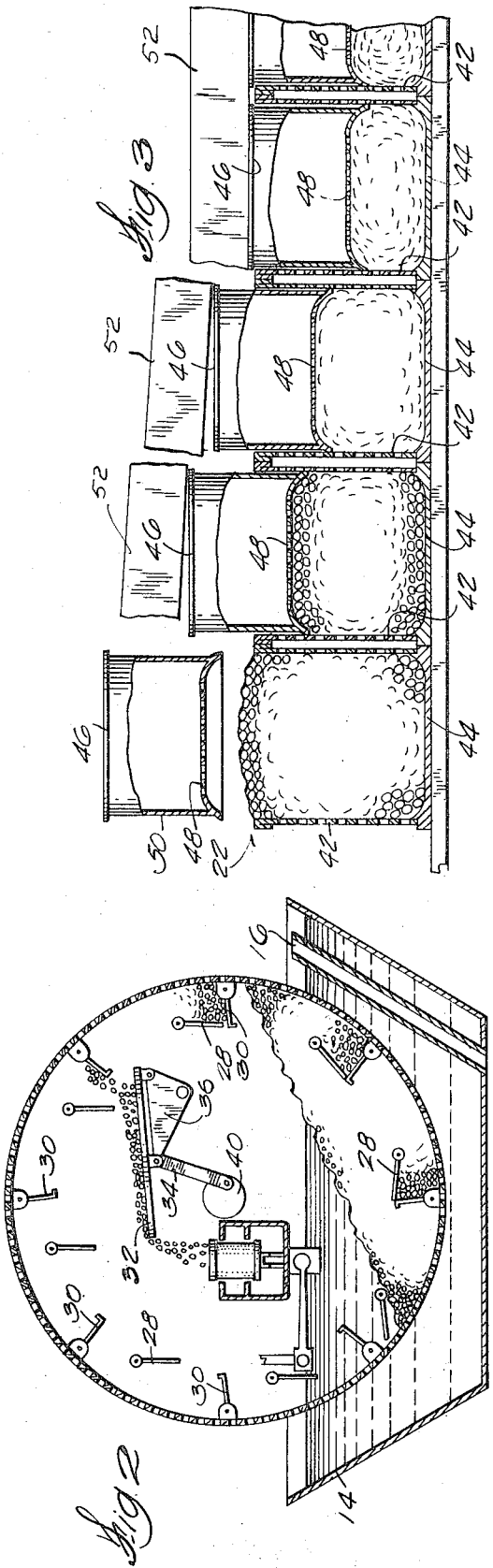
Fig. 3
Fig. 2

METHOD AND APPARATUS FOR MAKING EDAM AND GOUDA CHEESE

BACKGROUND OF THE INVENTION

In making Gouda or Edam cheese, the usual method pumps the curd and whey into Meunster hoops resting on the floor of an adjacent vat. Meunster hoops are open-ended rectangular boxes which serve to confine the curd while the whey drains off and the curd starts to knit. After some period of time and turning the hoop over a few times, the curd is self-supporting and is placed in an extrusion press which forces the curd through a tubular extrusion pipe or nozzle. The extruded curd is then cut off at a uniform thickness. The cutoffs are then placed into hoops and weighed with any shortage being made up by adding a curd or two to the hoop. The hoop follower is then placed on top of the hoop and the curd is then pressed to force additional whey from the curd.

After extrusion, the curd tends to have a memory for the cylindrical shape. Therefore, if pressure is relieved from the follower too soon, the cheese tends to revert to cylindrical rather than retaining the classic shape of Gouda or Edam cheese. Also curds added to make up weight shortage may not settle into the desired shape and the resulting cheese may have an undesired bump on it.

Since there is considerable manual labor in this method, there is an appreciable variation in time of draining and development before going into the extrusion press and this results in variation in quality.

SUMMARY OF THE INVENTION

This invention is directed to improving the quality of soft cheeses by reducing variations in the process. In accomplishing this, the extrusion step of the prior art is eliminated and the knitting curd is not given an opportunity to develop a memory for an undesired shape. The present apparatus and method eliminate a major amount of hard manual labor.

In carrying out this invention, we have developed a new way to fill the final hoops directly, i.e. without using the intermediate Muenster hoops or the extrusion press. The curd is lifted from the whey and is fed across a shaker table to the hoops. Traveling across the shaker table develops a desirable curd shape and the uniformity of fill is most satisfactory. Pressure is applied promptly and, since the curd only "knows" the shape of the final form hoop, no adverse shape memory is developed. The time lapse between taking the curd from the whey and application of pressure is quite uniform with uniform quality resulting. If desired, the fill weight may be adjusted by addition of a curd or so before application of pressure but, under this method, the curd in the hoop is still essentially loose and the added piece(s) can be assimilated without development of "bumps" in the end product.

The hoops used in this method have finely perforated sides and the ends allowing rapid expulsion of whey as pressure is applied to the follower. This is of importance since the whey expulsion is rapid in this process when pressure is applied to the follower.

DESCRIPTION OF THE DRAWINGS

FIG. 1 is a simplified side elevation with parts broken away to show the filling and compression of the hoops.

FIG. 2 is a vertical section through the filling section of FIG. 1.

FIG. 3 is a "compressed" side elevation showing the progression of the follower into the hoop.

DESCRIPTION OF THE PREFERRED EMBODIMENT

When the cheesemaker has determined that the proper curd development has been obtained in the usual manner, the curd and whey are pumped through a hose 10 into the open end of the rotating perforated drum 12 positioned in the shallow vat 14. The ends of the drum are journaled in the supporting framework and the whey can flow through the perforated cylindrical wall of the drum to drain from the vat 14 through the overflow pipe 16. The motor 18 is utilized to rotate the drum.

The conveyor 20 runs through the open ends of the drum and returns below the vat. At the left end in FIG. 1 the hoops 22 are fed onto the conveyor. At the filling section the conveyor is vibrated by mechanism contained within enclosure 24. Just past the filling section there can be a shaking-tipping rail section 26 if desired.

On the interior of the perforated drum there are a plurality of cam-operated bucket devices which appear best in FIG. 2. At the 180° position in FIG. 2 it will be noted that the gate 28 has been moved to a closed position with respect to the bottom member 30 of that bucket. As the drum rotates in the counterclockwise direction, curd is picked up in the bucket and at the 90° position the bucket has elevated curd above the surface of the curd and whey in the drum. The gate 28 and bottom 30 are perforated to allow whey to drain. As the rotation continues to the 45° position the cam operating the gate 28 permits the gate to swing open and the curd can now fall onto the shaker pan 32. This shaker pan is mounted on pivotally interconnected arms 34, 36 which can be vibrated by an eccentric drive 40 so as to shake the table. Suitable arrangements are provided for adjusting the slope of the shaker pan towards the conveyor. The vibration imparted to the shaker pan coupled with the slope feeds the curd across the shaker pan towards the conveyor. In transit this action gives the curd a more uniform shape which, in turn, reflects in more uniform filling of the hoop. The discreet curd particles fall into the hoops as they pass beneath the shaker pan and, since the hoops are being vibrated in this section, the particles settle into the hoops with surprising uniformity of fill. Any curd which misses the hoop falls back into the curd and whey at the bottom of the drum and is re-elevated and fed into subsequent hoops.

The side 42 and bottom 44 of each hoop are finely perforated. Thus whey can be continuously expelled from the hoop. Upon leaving the filling section, the hoops can go through an optional shaking and tipping section 27 which spills out any excess fill. Upon leaving the drum section, a follower 46 is placed on top of each hoop, either manually or by means of an automatic feed. This follower also has a perforated bottom 48 and side 50. After the follower has been placed on the hoop, the hoop and follower pass into a conveyor section having an inclined shoe 52 positioned above the conveyor and urged downwardly by springs 54 to exert a continuous downward pressure within the limits determined by the head 56 of each guide pin 58 contacting the upper surface of plate 60. Thus this arrangement insures a controlled application of pressure on the follower forcing the follower into the hoop as shown in FIG. 3 to expel whey from the curd and promote rapid and uniform knitting of the curd until the final Edam or Gouda shape has been achieved. The curd has not previously been given any other shape. Therefore, the uniformity of the finished shape is exceptionally good.

The conveyor can be made longer if desired to afford room for automatic weighing of the hoops leaving the filling section and to permit adjustment of the weight (by adding or removing a curd or two) in each hoop to obtain a uniform end weight. This would be done before placing the follower on the hoop and would generally follow present practice with the singular exception that the curd in the hoop in this process has not previously been compressed and thus any curd added to the hoop is not being added to a previously defined shape and, therefore, will not result in an unsightly bulge or bump on the end product.

With the present process the time lapse between removal of the curd from the whey and the placement of the follower on the hoop is quite uniform. As a result the end product is uniform and more consistent in quality than the prior extrusion method permitted. The shape of the cheese is uniformly good.

It will be appreciated that after the follower has been pressed all the way into the hoop, the shoe above the follower is continued for such length as will insure maintenance of adequate pressure for an adequate period of time to prevent the follower from "springing back" with resultant loss of cheese shape.

We claim:

1. Apparatus for use in making cheese of the Edam, Gouda, or similar types of cheese, a container into which curd and whey are pumped, means for lifting curd from the whey and transporting the curd into a discharge location, a perforate pan positioned at said discharge location to receive curd from said lifting means, a conveyor positioned above the level in said container, means for moving cheese hoops along the conveyor, means for discharging curd from said pan into the hoops on the conveyor with any spillage or overfill falling back into said container, means positioning a follower on each hoop after filling, and means for applying pressure on the follower.

2. Apparatus according to claim 1 in which the pan is vibrated and positioned in an inclined position to induce movement of curd to the discharge location.

3. Apparatus according to claim 2 in which the conveyor passes under the pressure applying means and the pressure applying means comprises a shoe positioned above the conveyor and inclined towards the conveyor whereby the shoe forces the follower into the hoop as it progresses along the conveyor.

4. Apparatus according to claim 3 in which the side of the hoop is perforated to permit whey to be expelled rapidly.

5. Apparatus according to claim 4 in which the ends of the hoop and follower are also perforated.

6. Apparatus according to claim 2 including means for vibrating the hoops while they are being filled to settle the curd into the hoops and induce spilling of any excess fill.

* * * * *

PO-1050 (5/69)

UNITED STATES PATENT OFFICE
CERTIFICATE OF CORRECTION

Patent No. 3,802,332      Dated April 9, 1974

Inventor(s) Bernard W. Fassbender, Thomas H. Fassbender, and William L. Hermann

It is certified that error appears in the above-identified patent and that said Letters Patent are hereby corrected as shown below:

The name of the Assignee should read -- WHITE CLOVER DAIRY COMPANY, INC. --

Signed and sealed this 3rd day of December 1974.

(SEAL)
Attest:

McCOY M. GIBSON JR.
Attesting Officer

C. MARSHALL DANN
Commissioner of Patents